US011553142B2

(12) United States Patent
Mika et al.

(10) Patent No.: US 11,553,142 B2
(45) Date of Patent: Jan. 10, 2023

(54) VIRTUAL THREE-DIMENSIONAL OBJECTS IN A LIVE VIDEO

(71) Applicants: Thorsten Mika, Leichlingen (DE); Hendrik Fehlis, Bonn (DE)

(72) Inventors: Thorsten Mika, Leichlingen (DE); Hendrik Fehlis, Bonn (DE)

(73) Assignee: TRACKMEN GMBH, Cologne (DE)

(*) Notice: Subject to any disclaimer, the term of this patent is extended or adjusted under 35 U.S.C. 154(b) by 0 days.

(21) Appl. No.: 17/276,319

(22) PCT Filed: Sep. 3, 2019

(86) PCT No.: PCT/EP2019/073439
§ 371 (c)(1),
(2) Date: Mar. 15, 2021

(87) PCT Pub. No.: WO2020/053032
PCT Pub. Date: Mar. 19, 2020

(65) Prior Publication Data
US 2022/0060642 A1  Feb. 24, 2022

(30) Foreign Application Priority Data
Sep. 13, 2018  (DE) ...................... 10 2018 122 435.4

(51) Int. Cl.
*H04N 5/272* (2006.01)
*H04N 5/222* (2006.01)
(Continued)

(52) U.S. Cl.
CPC .......... *H04N 5/272* (2013.01); *H04N 5/2224* (2013.01); *H04N 5/2621* (2013.01)

(58) Field of Classification Search
CPC .... H04N 5/2627; H04N 5/2224; H04N 5/272; H04N 5/222; H04N 5/262; H04N 5/265;
(Continued)

(56) References Cited

U.S. PATENT DOCUMENTS 6,445,815 B1 * 9/2002 Sato .................. G06K 9/00
382/154
9,756,277 B2 * 9/2017 Partouche ........... H04N 5/2228
(Continued)

FOREIGN PATENT DOCUMENTS

DE   102004046144 A1    3/2006
DE   102005005795 A  *  8/2006  ............. G06T 13/00
(Continued)

OTHER PUBLICATIONS

International Search Report dated Nov. 22, 2019 re: Application No. PCT/EP2019/073439, pp. 1-2, citing: US 20150358508 A1, DE 102005005795 A1 and DE 102004046144 A1.

*Primary Examiner* — Marly S Camargo
(74) *Attorney, Agent, or Firm* — Cantor Colburn LLP

(57) ABSTRACT

A method for depicting a three-dimensional object in a real environment, depicted in a final video played back on a monitor, includes the steps of generating at least one object video by filming the object with a camera from different filming directions for generating an object video, wherein the angle of an optical axis of the camera in relation to a central axis of the object is in each case determined for the respective filming direction, so that an angle can be associated with each filming direction. The method also includes generating a live video with at least one live camera and simultaneously inserting the object video into the live video at a defined position in the environment for generating the final video, and changing the position of the live camera in the environment and simultaneously depicting the object in the final video in a desired perspective in the environment.

12 Claims, 2 Drawing Sheets

(51) Int. Cl.
*H04N 5/262* (2006.01)
*G06T 19/00* (2011.01)

(58) Field of Classification Search
CPC ....... H04N 5/2621; G06T 7/00; G06T 19/006;
G06T 15/00; G06T 17/00; G06T 7/194
See application file for complete search history.

(56) References Cited

U.S. PATENT DOCUMENTS

| | | | |
|---|---|---|---|
| 2003/0043270 A1* | 3/2003 | Rafey | H04N 7/18 348/157 |
| 2011/0234631 A1* | 9/2011 | Kim | G09G 5/00 345/632 |
| 2012/0314077 A1 | 12/2012 | Clavenna, II et al. | |
| 2015/0358508 A1 | 12/2015 | Partouche et al. | |
| 2016/0073095 A1 | 3/2016 | Ogura | |
| 2018/0131907 A1* | 5/2018 | Schmirler | H04N 5/2328 |
| 2018/0196261 A1* | 7/2018 | Schickel | G02B 27/0101 |
| 2020/0312033 A1* | 10/2020 | Ohashi | G06T 19/006 |
| 2022/0114784 A1* | 4/2022 | Schickel | G06T 10/20 |

FOREIGN PATENT DOCUMENTS

| | | |
|---|---|---|
| DE | 102005005795 A1 | 8/2006 |
| EP | 0772350 A2 | 5/1997 |

* cited by examiner

VIRTUAL THREE-DIMENSIONAL OBJECTS IN A LIVE VIDEO

TECHNICAL FIELD

The disclosure relates to a method for depicting a three-dimensional object in a real environment, depicted in a final video played back on a monitor.

BACKGROUND

In television and internet video productions, virtual objects are increasingly embedded into a video that is broadcast live. The viewer is unable at first glance to distinguish between the real live video and the inserted virtual object. Virtual insertions are almost no longer recognizable as such particularly if the camera remains stationary during live production, or while the live video is being generated. However, problems arise when the position of the camera changes during recording, because the perspective of the inserted object must also change accordingly.

For example, images or videos of people are often prepared and placed by insertion in the room or studio as a two-dimensional image or video. For the viewer, this then results in an image depicted on his monitor or television set, which is largely formed from the live video into which, however, the two-dimensional person is also inserted.

However, if the camera recording the live image is moved so that it no longer looks frontally at the inserted person, the images always appear narrower. In the end, the inserted person would no longer be seen if the camera moves around them by 90° and is disposed to the side of them.

To avoid this effect, there is the option of optically co-rotating the image of the inserted computer graphics when the camera moves around it. This prevents the image from appearing narrower due to the new angle; however, it is then only seen straight from the front, i.e. two-dimensionally, from all perspectives.

It is also known to first capture objects, e.g. people, by means of a three-dimensional scan. In the process, the depth of the object is also measured at every camera shot in order to finally be able to prepare a three-dimensional model of the object. In a next process step, the different shots of the object from the respective perspectives are overlaid (mapped) so as to result in the three-dimensional body. Thus, in principle, the individual shots are in this case "spanned", piece by piece, onto the body. However, this is done portion by portion, wherein the transitions cannot always be displayed flawlessly. The three-dimensional shape of the object is also not perfect in this case, which can often be discerned in faces in such shots; so-called artifacts are produced. Notwithstanding the above, the generation of such three-dimensional scans is complex and requires a large data volume; manual post-processing is also necessary.

Another issue arises if the object is a person, for example, and is supposed to move in the future live video. In that case, the three-dimensional scan also has to be animated, for which purpose knowledge or information, e.g. about joints and possible directions of movement, have to be taken into account. Also, such an animation is rarely perfect; generally, it is clearly recognizable that this is an animated video; the movement often appear unnatural.

SUMMARY

The present disclosure embeds a virtual object into a generated live video in as visually attractive a manner as possible. In particular, changes of perspective by moving the camera are supposed to be possible without the inserted object video appearing unnatural or being distorted too much. However, it is also essential that the method can be carried out as easily as possible. It is supposed to require as small a data volume as possible and, in particular, necessitate no manual post-processing, or only to a minor extent.

According to the disclosure, the advantage is achieved with a method having the method steps of the independent claim.

Accordingly, the core idea of the disclosure is that, first, an object video is generated which shows the object from different angles. For this purpose, the object is thus first shot with a filming camera from different angles or filming directions. The respective position of the filming camera relative to the object is detected and stored in the process.

The term filming direction relates to a central axis of the object, which may be the vertical axis upwards or the horizontal transverse axis, but also any other central axis passing through the object.

In a second method step, this object video is loaded into a computer graphic and depicted on a rectangle (i.e. only two-dimensionally as video texture), for example, which is positioned in the environment, hereinafter referred to as the studio. The studio is filmed with a live camera during the recording, and a live video is generated. In the latter, the object appears to the viewer virtually at a certain location in space. Of course, the environment does not have to be an enclosed studio; the live video may also be generated at any outdoor location.

The video that the observer can perceive thus includes the live video with the embedded object video. For simplification purposes, this video that the observer can perceive will be referred to as the final video. The object video is adapted to the position of the live camera by means of a data processing device commonly used for this purpose.

What is important is that the relative angle between the object and the filming camera is known while filming the object, and that the video sequence filmed at this relative angle can later be determined.

In a particularly simple variant, the object may be placed on a rotary table for this purpose, which rotates during the filming process. The filming camera, which is then stationary, films the object, e.g. a person, preferably continuously over 360°. Thus, the filming process thus takes place one-dimensionally; the object is only rotated about its vertical or upward axis. The perspective or relative angle can be associated with a certain video sequence by means of a corresponding measuring device on the rotary table, for example. An encoder determining the respective degree of rotation is a possible option for this. A linear association may also be carried out by counting the individual pictures that were shot and then correlating them with the corresponding degree value.

In a particularly advantageous, simple variant, the rotated and filmed degree value of the rotary table, most frequently 360 degrees, is divided by the number of video images shot, which yields the angle per video image. Though the calculation result is slightly less exact than the result from an encoder, it simplifies the structure and is sufficient for most desired applications. This method can also be used for other perspectives, e.g. in the case of a rotation of the object about its horizontal axis, or when filming the static or unmoving object by moving the filming camera about the vertical axis of the object.

In a particularly simple variant, the rotary table may have a visible scale on its outer face, which is also filmed during the filming process. It is thus possible to see, in the shot object video, from which perspective the object was filmed at a certain point in time, or which degree value had been reached at this point in time. In this case, the object video is embedded without the scale into the live video; however, the stored information apparent from the scale is nevertheless used as a video attribute for the desired depiction.

In an alternative variant, the object is positioned in a stationary and immovable manner. In that case, the filming camera changes its position; for example, it circles once around the object over 360° and films it continuously in the process. Analogously to the above-mentioned variant with the rotary table, the relative position or relative angle between the filming camera and the central axis of the objective are permanently determined and stored also in this case.

Both variants generate an object video showing the object from different directions, preferably across the full 360°.

The essential point is that the position of the recording live camera is also determined permanently. Commonly used so-called tracking systems can be used for this purpose. If the relative angle now changes between the inserted object, i.e. the rectangle or the object video shown therein, then, according to the disclosure, that video sequence of the object video is in each case played back that corresponds to the relative angle of the live camera to the virtual object. Thus, if the live camera moves around the virtual object, the latter is readjusted by playing back the object video in a targeted manner, and always appears in the correct perspective. For this purpose, the object video is played back forwards or backwards accordingly. In the final video that is shown, the object, e.g. a person, thus always appears as the observer would see it in the studio if it were real.

The method according to the disclosure can be improved further by the object video being shot with as high a resolution as possible. It is thus possible to show even partial areas of the object clearly during the later playback, by zooming in.

In contrast to the prior-art methods, the object may also move during filming, which is advantageous particularly when filming of people. A turn of the head or an eye movement, for example, but in the end also more complex movements may be filmed. Though they are always the same when reproduced in the final video, this results in a very natural movement, however, in contrast to the known scanned and animated figures or methods. For example, if the person rotates about their own vertical axis while the filming camera moves around them, then attention should be paid, when recording the live video, that this movement of the live camera corresponds to the movement of the filming camera. Otherwise, the movement would be executed more slowly or also rapidly, and thus appear unnatural.

In principle, shooting several objects at the same time is also possible, in order to show natural overlapping or shadowing. Alternatively, different objects may also be shot individually and later combined in the object video.

According to the disclosure, tilting the rotary table during filming is also possible, in order thus to set up a different filming angle to the filming camera.

As an alternative to arranging the object on a rotary table rotating about its vertical axis, according to the disclosure, it may also be arranged on a horizontal shaft which, accordingly, rotates about the horizontal axis. This may be advantageous in the case of objects, for example, that are supposed to also be observed from above. In this context, pieces of furniture, building models, plants and the like are conceivable.

According to the disclosure, the objects can thus be attached to a rotating horizontal shaft and filmed by a stationary camera. As an alternative, it is of course also possible to guide the filming camera around a stationary object in a vertical plane.

The distance of the filming camera from the object may also be detected and stored during filming, as an additional dimension. It is thus possible, even while generating the live or final video, to change the distance with the live camera from the virtual object, because the object video can be adapted accordingly.

According to the disclosure, in a particularly simple variant of the method according to the disclosure, the detection of the distance of the filming camera can be dispensed with. The object video, or the video texture (the region in the final video onto which the video is spanned, so to speak) is disposed in a stationary manner in the environment. If the live camera moves away, this movement is measured by the camera tracking system, and the virtual scene, i.e. the object video or the region onto which it is spanned, is shifted accordingly. It then automatically becomes smaller or larger because the live camera moves, just like a natural object. Since only a portion of the image is obtained, the perspective is slightly compressed or stretched; thus, the object is thus provided with a slightly flatter or steeper impression of depth. Though the perspective of the object is in that case not the correct one, but since the depth of the object, for instance in the case of humans, is very small, this is hardly perceived by the viewer; the eye is very undiscerning in this regard. It is thus possible to further reduce the complexity and amount of data.

This also applies to the height of the camera, which may also be changed and measured during the generation of the object video. Accordingly, this permits a change in the height of the live camera while generating the final video.

Though it is possible in the end, according to the disclosure, to film the object from all directions in order to also depict all directions in a future final video. However, it has proved to be particularly advantageous if a shot is created that is as simple as possible, preferably one-dimensional, because particularly the data volume is thus kept small. Most studio shots are generated in a one-dimensional manner anyway; the live camera usually remains at the same height during the shot.

In another advantageous variant of the disclosure, it is also possible to also generate the object video live and insert it as a second live video into the first live video shot by the live camera. In this case, the position of the live camera is measured with a suitable camera tracking system during the live shot in the studio.

Instead of searching for the appropriate point in the video, the rotary table is rotated, i.e. controlled, depending on the position of the live camera. At the same time, i.e. live, the object or person is located on the rotary table. A special advantage is that the person is able to move live, and also react to the live events; in the process, the rotary table always rotates the person into the appropriate direction, which prescribes the position of the live camera. Thus, the object video is not temporarily stored but also broadcast live as a second live video within the first live video.

BRIEF DESCRIPTION OF THE DRAWINGS

The disclosure is explained further with reference to the following Figures. They are only supposed to illustrate the principle of the disclosure, but are not supposed to limit the disclosure to the exemplary embodiments shown. In the Figures.

DETAILED DESCRIPTION OF THE DRAWINGS

It is noted that the Figures are drawn in a very simplified manner; in particular, they are not to scale.

Figure 1:
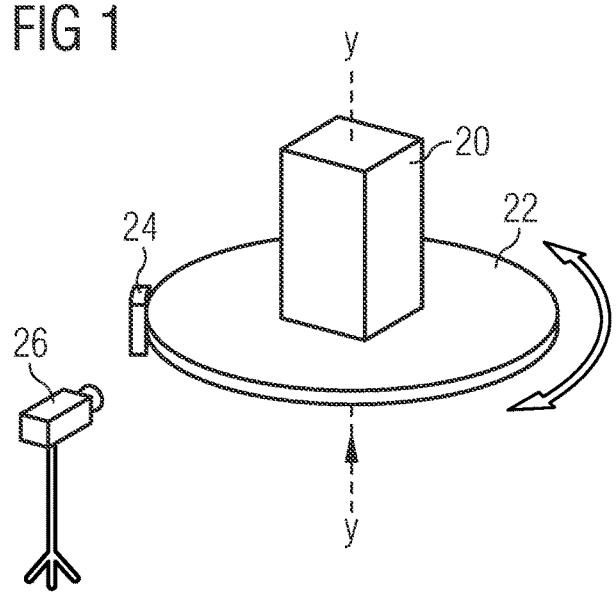
FIG. 1: shows a rotary table with an object and a filming camera.

FIG. 1 illustrates a first option for generating an object video. An object 20 to be filmed is disposed on a rotary table 22. A measuring device for detecting a rotation of the rotary table 22, i.e. the angle of rotation, is provided on the rotary table 22. In this case, the measuring device 24 is connected to a data processing device that is not depicted.

A filming camera 26 is disposed in a stationary manner and films the object 20 while the rotary table 22 rotates and its rotation is detected by the measuring device 24. In this way, an object video 28 is generated which shows the object 20 from different filming directions. In the illustrated exemplary embodiment, the vertical axis Y-Y forms a central axis to which the filming direction relates. Basically, the rotary table 22 may be turned by only a few degrees in the process, but also by 360° or even 720°; in the end, this depends on the requirements for the object video 28 to be generated. The rotation by 720° has the effect than no transition flaws or seams are created as one moves completely around the object.

Figure 2:
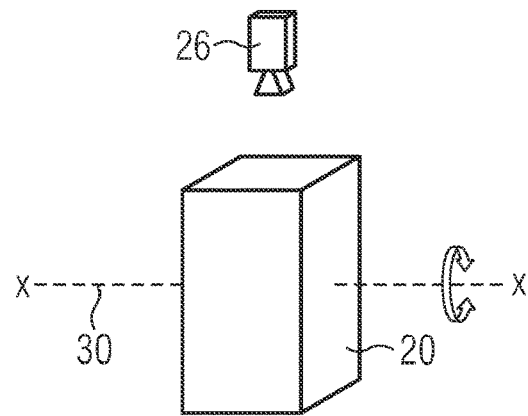
FIG. 2: shows an apparatus for horizontally rotating the object and a filming camera.

FIG. 2 shows an alternative in which the object is fixed to a horizontally orientated shaft 30. The filming camera 26 is also stationary and disposed at a fixed height above the object 20. Of course, the filming camera 26 may also be positioned underneath or to the side of the object. In this exemplary embodiment, the vertical axis X-X forms the central axis to which the filming direction relates.

Figure 3:
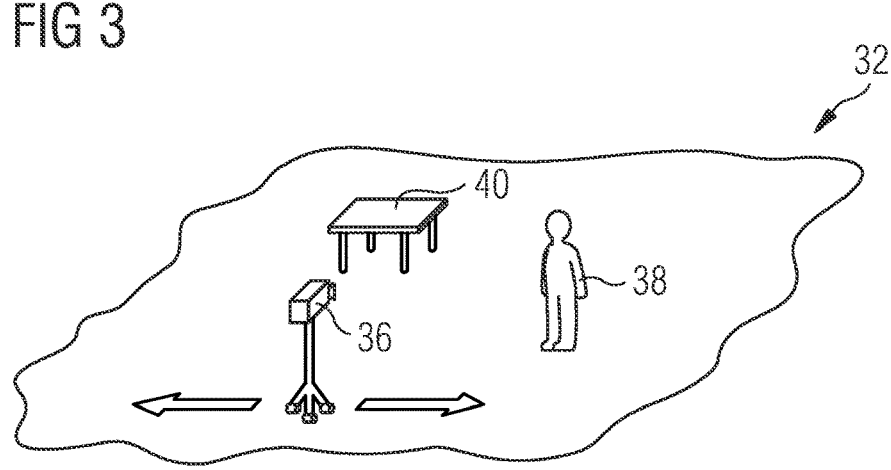
FIG. 3: shows an environment for generating a final video.

FIG. 3 shows an exemplary environment 32 in which a live video 34 is to be generated. The environment usually is a studio for a TV production. A live camera 36 generates the live video 34 and films a person 38 and an item 40, depicted as a table. The live camera 36 can be moved within the environment 32, i.e. change its position.

Figure 4:
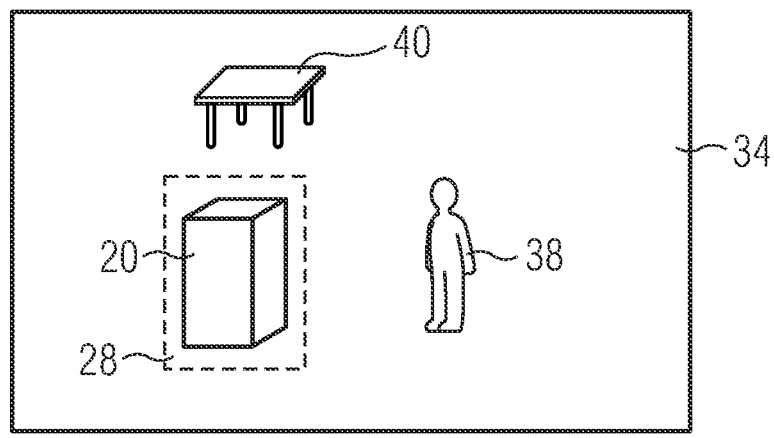
FIG. 4: shows a simplified illustration of the final video from a first perspective.
Figure 5:
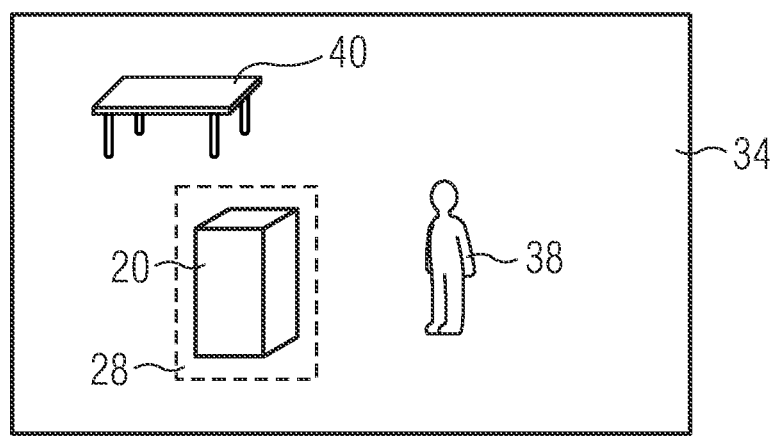
FIG. 5: shows a simplified illustration of the final video from a second perspective.

FIGS. 4 and 5 illustrate a generated final video 42, which is formed of the recorded live video 34 and the object video 28. The object video 28 is embedded into the live video 34, so that to the viewer, the object 20 appears stationary within the environment 32. For example, such a final video 42 is broadcast to television sets via a TV network.

FIGS. 4 and 5 illustrate the effect that is created when the live camera 36 changes its position within the environment 32. The perspective changes with respect to the object 20, which nevertheless is depicted in a correct perspective.

The disclosure is not limited to the above-described and illustrated embodiments, but also includes other options that can be realized on the basis of the disclosure. For example, several object videos 28 may also be embedded into the final video 42. For example, two or more object videos 28, which are also shot live, may be embedded, e.g. several individual people.

The invention claimed is:

1. A method for depicting a three-dimensional object in a real environment, depicted in a final video played back on a monitor, the method including the following steps:
generating at least one object video by filming the object with a filming camera from different filming directions for generating an object video, wherein the angle of an optical axis of the filming camera in relation to a central axis of the object is in each case determined for the respective filming direction, so that an angle can be associated with each filming direction,
generating a live video with at least one live camera and simultaneously inserting the object video into the live video at a defined position in the environment for generating the final video, and
changing the position of the live camera in the environment and simultaneously depicting the object in the final video in a desired perspective in the environment, by
the respective position of the live camera in the environment being determined while shooting the live video,
a video sequence of the object video is shown that always corresponds to the relative angle between the live camera and the object, such that the object video is adapted to the determined position of the live camera, showing the object in the final video from the direction that approximately corresponds to the direction of the live camera towards the desired position of the object in the environment.

2. The method according to claim 1, wherein the filming of the object includes the following steps:
arranging the filming camera in a stationary manner, and rotating the object about its vertical axis.

3. The method according to claim 2, wherein the filming of the object includes the following steps:
positioning the object on a rotary table,
rotating the rotary table and simultaneously filming the object with the filming camera, and
determining the filming direction by determining the degree value of the rotation of the rotary table.

4. The method according to claim 1, wherein the filming of the object includes the following steps:
arranging the filming camera in a stationary manner, and rotating the object about its horizontal axis.

5. The method according to claim 1, wherein the filming of the object includes the following steps:
arranging the filming camera in a stationary manner, and simultaneously rotating the object about its vertical axis and its vertical axis.

6. The method according to claim 1, wherein the filming of the object includes the following steps:
arranging the object in a stationary and static manner, and filming the object while simultaneously moving the filming camera in a horizontal plane around the object.

7. The method according to claim 1, wherein the filming of the object includes the following steps:
arranging the object in a stationary and static manner, and filming the object while simultaneously moving the filming camera in a vertical plane around the object.

8. The method according to claim 1, wherein the filming camera is moved by at least 360° around the object while filming.

9. The method according to claim 1, wherein the position of the filming camera during filming is varied such that the object is filmed from all directions.

10. The method according to claim 1, wherein the filming directions of the filming camera towards the central axis of the object are stored, and the object video is adapted to the determined position of the live camera in the environment by playing back the video sequence of the object video, which shows the object from the direction that approximately corresponds to the direction of the live camera towards the desired position of the object in the environment.

11. The method according to claim 1, wherein dividing the rotated and filmed degree value of the object by the shot number of video images as a basis for finding the video sequence showing the object in the desired perspective in the final video.

12. The method according to claim 1, wherein the at least one object video is embedded as a second live video into the first live video.

* * * * *